(12) United States Patent
Seol

(10) Patent No.: US 12,427,961 B2
(45) Date of Patent: Sep. 30, 2025

(54) BRAKE FOR VEHICLE AND CONTROL METHOD THEREFOR

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 449 days.

(21) Appl. No.: 17/562,131

(22) Filed: Dec. 27, 2021

(65) Prior Publication Data
US 2023/0143158 A1 May 11, 2023

(30) Foreign Application Priority Data
Nov. 9, 2021 (KR) .......... 10-2021-0153081

(51) Int. Cl.
*B60T 13/14* (2006.01)
*B60T 8/1761* (2006.01)
(Continued)

(52) U.S. Cl.
CPC ........ *B60T 13/142* (2013.01); *B60T 8/17616* (2013.01); *B60T 13/686* (2013.01);
(Continued)

(58) Field of Classification Search
CPC .... B60T 8/4081; B60T 13/686; B60T 13/142; B60T 13/745; B60T 2270/10;
(Continued)

(56) References Cited

U.S. PATENT DOCUMENTS

| | | | |
|---|---|---|---|
| 7,703,348 B2 * | 4/2010 | Reisch ............ | F16H 61/0202 74/473.11 |
| 10,919,509 B2 * | 2/2021 | Roh ............... | B60T 13/66 |
| 2020/0047731 A1 * | 2/2020 | Reuter ............ | B60T 13/146 |

FOREIGN PATENT DOCUMENTS

| | | | | |
|---|---|---|---|---|
| CN | 104249723 A | * | 12/2014 | ...... B60T 13/142 |
| JP | 2009-137376 A | | 6/2009 | |

(Continued)

OTHER PUBLICATIONS

JP 2012076572 A (Year: Apr. 2012).*
Office Action issued May 22, 2023 in corresponding Korean Patent Application No. 10-2021-0153081.

*Primary Examiner* — Robert A. Siconolfi
*Assistant Examiner* — Mahbubur Rashid
(74) *Attorney, Agent, or Firm* — Novo TechIP International PLLC

(57) ABSTRACT

The present disclosure provides a vehicle brake comprising: a reservoir configured to store a fluid therein; a hydraulic circuit configured to transfer a hydraulic pressure to a wheel of a vehicle; a plurality of valves disposed to regulate a flow of the fluid in the hydraulic circuit; and a master cylinder including a cylinder body, a main piston which is movably disposed within the cylinder body and in which a receptacle is formed at one side thereof, and a center piston which is disposed within the cylinder body and in which a penetration hole is formed in at least a part thereof, wherein the penetration hole is formed to have a size smaller than a cross-sectional area of the receptacle, and as the main piston moves, at least a part of the center piston is inserted into the receptacle, and thus a pressurizing area of the main piston decreases.

11 Claims, 9 Drawing Sheets

(51) Int. Cl.
 *B60T 13/68* (2006.01)
 *B60T 8/40* (2006.01)
(52) U.S. Cl.
 CPC ......... *B60T 8/4081* (2013.01); *B60T 2210/12* (2013.01); *B60T 2240/00* (2013.01); *B60T 2270/10* (2013.01); *B60T 2270/402* (2013.01)
(58) Field of Classification Search
 CPC ......... B60T 2270/402; B60T 2270/602; B60T 8/3255; B60T 8/17616; B60T 2210/12; B60T 2240/00
 See application file for complete search history.

(56) References Cited

FOREIGN PATENT DOCUMENTS

KR  10-2014-0135043 A  11/2014
KR  10-2016-0090675 A  8/2016

* cited by examiner

BRAKE FOR VEHICLE AND CONTROL METHOD THEREFOR

CROSS-REFERENCE TO RELATED APPLICATIONS

This application claims priority to and the benefit of Korean Patent Application No. 10-2021-0153081, filed on Nov. 9, 2021, the disclosure of which is incorporated herein by reference in its entirety.

BACKGROUND OF THE INVENTION

1. Field of the Invention

The present disclosure relates to a vehicle brake and a method of controlling the same.

2. Discussion of Related Art

The contents described herein provide only background information and do not constitute the related art.

An electronic stability control (ESC) integrated brake system is a conventional brake system (CBS) which includes an ESC and to which active braking is applied. While a vehicle is traveling, when stability of a vehicle is degraded, the ESC integrated brake system performs an anti-lock brake system (ABS) function, a vehicle dynamics control (VDC) function, a traction control system (TCS) function, and the like to secure stability.

The ESC integrated brake system includes a master cylinder, a pedal simulator, a motor, a screw, a nut, a hydraulic circuit, and a plurality of valves. The master cylinder is a member which generates a hydraulic pressure required for braking a vehicle and is divided into a single-acting master cylinder and a double-acting master cylinder according to a direction in which a hydraulic pressure is generated.

The double-acting master cylinder generates a hydraulic pressure whenever a piston moves in a forward or backward direction. When a movement direction of the piston is changed, the double-acting master cylinder takes time to generate a hydraulic pressure behind the piston, and thus the double-acting master cylinder has a problem in that braking efficiency is reduced when emergency braking is required.

When the single-acting master cylinder is used in order to solve such a problem of the double-acting master cylinder, since the master cylinder, of which a cross-sectional area is small and a length is long, should be manufactured in order to generate a high pressure of about 200 bar, there is a problem of increasing a package size of a brake system.

BRIEF SUMMARY OF THE INVENTION

The present disclosure is directed to providing a vehicle brake capable of enhancing braking efficiency during emergency braking using a single-acting master cylinder including a piston of which a pressurizing area is changed.

The present disclosure is directed to providing a vehicle brake allowing a package size of a braking system to be reduced using a single-acting master cylinder including a piston of which a pressurizing area is changed.

Objectives to be solved by the present disclosure are not limited to the above-described objectives, and the other objectives, which are not described above, will be clearly understood by those skilled in the art through the following descriptions.

According to at least one aspect, the present disclosure provides a vehicle brake comprising: a reservoir configured to store a fluid therein; a hydraulic circuit configured to transfer a hydraulic pressure to a wheel of a vehicle; a plurality of valves disposed to regulate a flow of the fluid in the hydraulic circuit; and a master cylinder including a cylinder body, a main piston which is movably disposed within the cylinder body and in which a receptacle is formed at one side thereof, and a center piston which is disposed within the cylinder body and in which a penetration hole is formed in at least a part thereof, wherein the penetration hole is formed to have a size smaller than a cross-sectional area of the receptacle, and as the main piston moves, at least a part of the center piston is inserted into the receptacle, and thus a pressurizing area of the main piston decreases.

According to another aspect, the present disclosure provides a method of controlling a vehicle brake including a main piston in which a receptacle is formed at one side thereof and a center piston in which a penetration hole having a size smaller than a cross-sectional area of the receptacle is formed, the method comprising: moving the main piston in a forward direction; determining whether the main piston reaches one side end of the center piston; determining whether a wheel of a vehicle is in a slip state; determining whether an anti-lock brake system (ABS) function is performed when it is determined that the wheel of the vehicle is in the slip state; and opening a first valve disposed between the penetration hole and a reservoir and moving the main piston in the forward direction again when it is determined that the ABS function is not being performed.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Figure 1:
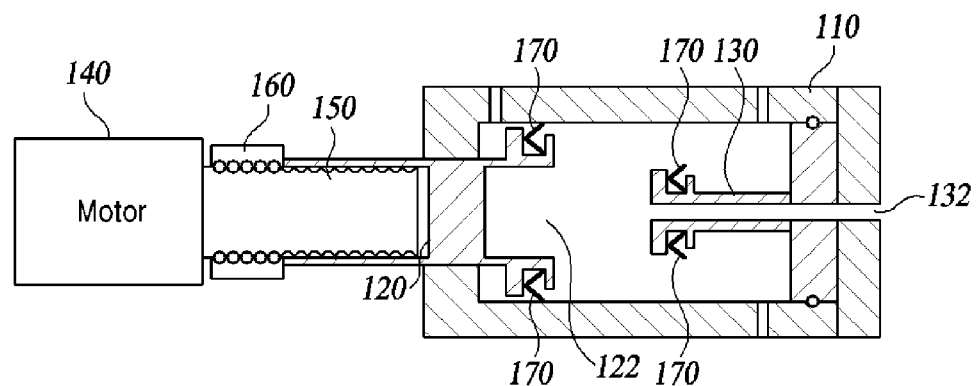
FIG. 1 is a view illustrating a structure of a master cylinder according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a view illustrating a structure of a master cylinder according to one embodiment of the present disclosure.

Figure 2:
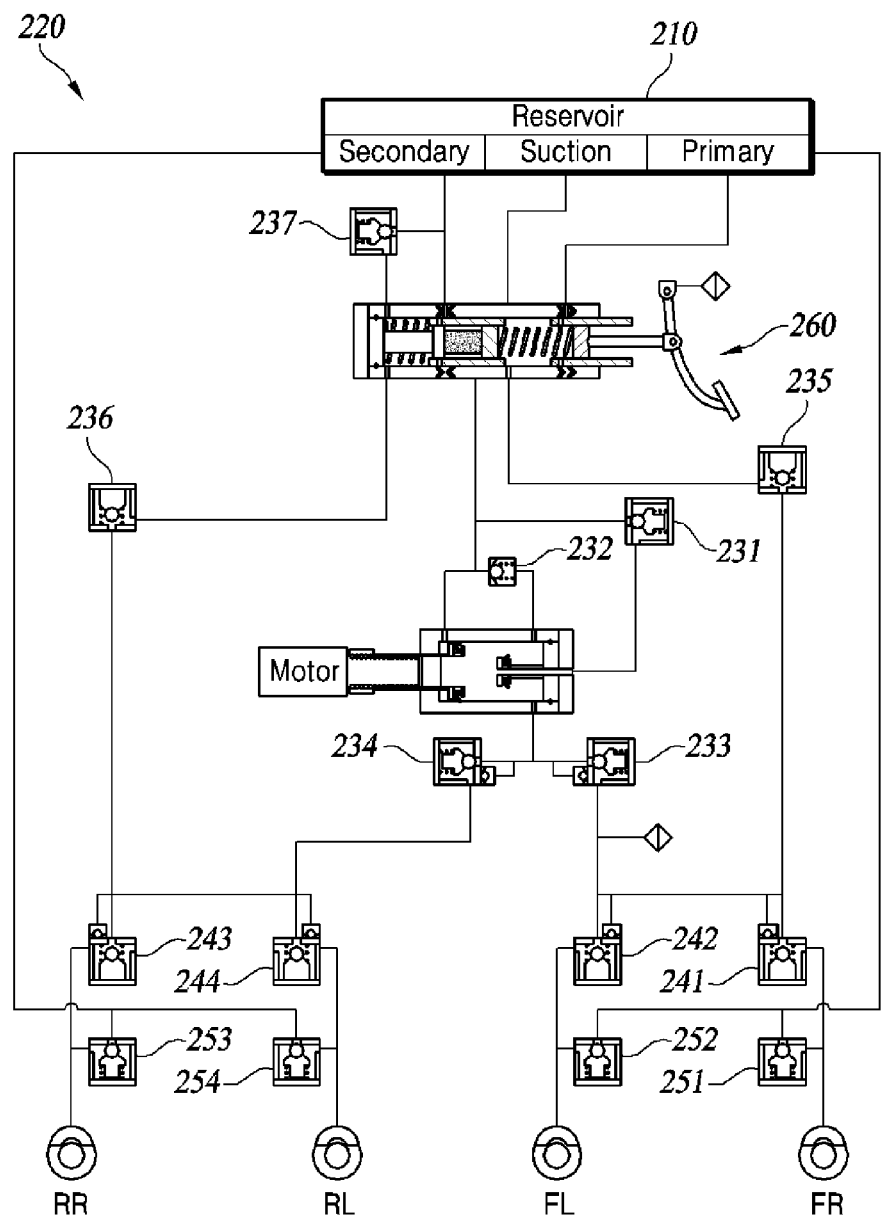
FIG. 2 is a hydraulic circuit diagram illustrating a vehicle brake according to one embodiment of the present disclosure.

FIG. 2 is a hydraulic circuit diagram illustrating a vehicle brake according to one embodiment of the present disclosure.

Referring to FIGS. 1 and 2, the vehicle brake according to one embodiment of the present disclosure may include a master cylinder 100, a reservoir 210, a hydraulic circuit 220, a plurality of valves, a pedal simulator 260, and a control unit (not shown).

The master cylinder 100 may include a cylinder body 110, a main piston 120, a receptacle 122, a center piston 130, a penetration hole 132, a motor 140, a screw 150, a nut 160, and sealing members 170.

The master cylinder 100 generate a hydraulic pressure required for braking a vehicle. The master cylinder 100 is connected to the reservoir 210 and wheels FR, FL, RR, and RL of the vehicle. The master cylinder 100 may transfer the hydraulic pressure to the wheels FR, FL, RR, and RL using the hydraulic circuit 220. The master cylinder 100 may operate in a single-acting manner.

The cylinder body 110 may be formed as a hollow cylinder. A brake oil required for generating the hydraulic pressure flows into the cylinder body 110. The main piston 120, the center piston 130, the sealing members 170, and the like are disposed in the cylinder body 110. The cylinder body 110 is connected to the reservoir 210 and the wheels FR, FL, RR, and RL using the hydraulic circuit 220.

The main piston 120 is moveably disposed within the cylinder body 110. The receptacle 122 is formed at one side of the main piston 120. The main piston 120 may be formed as a hollow cylinder. The main piston 120 is connected to the nut 160 and moved with the nut 160 according to movement of the nut 160. The main piston 120 generates the hydraulic pressure required for braking the vehicle by moving from one end of the cylinder body 110 in a direction toward the other end (hereinafter, referred to as a forward movement). As the main piston 120 moves in a forward direction, the center piston 130 may be inserted into the receptacle 122.

The receptacle 122 is formed to have a cross sectional area greater than a cross sectional area of the penetration hole 132. As at least a part of the center piston 130 is inserted into the receptacle 122, a pressurized area of the main piston 120 decreases. At least one sealing member 170 may be disposed between an outer surface of the main piston 120 and an inner surface of the cylinder body 110.

The center piston 130 is disposed at the other end of an inner side of the cylinder body 110. The center piston 130 may be formed as a hollow cylinder. The penetration hole 132 is formed in at least a part of the center piston 130. The penetration hole 132 is connected to the reservoir 210, and a first valve 231 is disposed between the penetration hole 132 and the reservoir 210. The penetration hole 132 is formed to have a size smaller than the cross-sectional area of the receptacle 122. As the main piston 120 moves, the center piston 130 may be inserted into the receptacle 122. As the center piston 130 is inserted into the receptacle 122, a pressurizing area of the main piston 120 decreases. At least one sealing member 170 may be disposed on an outer surface of the center piston 130. The center piston 130 may be formed to have one of various lengths according to a desired pressure required for braking the vehicle.

The motor 140 generates a driving force. The motor 140 is connected to the screw 150 and transfers the driving force to the screw 150. A position sensor (not shown) may be installed at one side of the motor 140. The position sensor detects displacement of the main piston 120.

The screw 150 is connected to one side of the motor 140. The screw 150 rotates using the driving force transferred from the motor 140. The screw 150 is connected to the nut 160. The screw 150 may be a ball screw.

The nut 160 is connected to the screw 150. The nut 160 moves in a longitudinal direction of the screw 150 according to rotation of the screw 150. The nut 160 is connected to the main piston 120 to move the main piston 120.

The sealing member 170 may be disposed between the outer surface of the main piston 120 and the inner surface of the cylinder body 110. The sealing member 170 may be disposed on the outer surface of the of the center piston 130. The sealing member 170 may be configured to allow a fluid to transfer therethrough unidirectionally. The sealing member 170 may be provided as the plurality of sealing members 170 and formed in a "V" shape.

The reservoir 210 is configured to store the fluid such as the brake oil. The reservoir 210 is connected to all of the wheels FR, FL, RR, and RL, the pedal simulator 260, the cylinder body 110, and the penetration hole 132 using the hydraulic circuit 220.

The hydraulic circuit 220 is configured to transfer the hydraulic pressure generated by the master cylinder 100 and/or the pedal simulator 260 to the wheels FR, FL, RR, and RL. The hydraulic circuit 220 connects the components of the vehicle brake according to one embodiment. A plurality of valves configured to regulate a flow of the fluid are disposed in the hydraulic circuit 220. At least one pressure sensor may be disposed in the hydraulic circuit 220.

A first valve 231 is disposed between the penetration hole 132 and the reservoir 210. In a state in which at least a part of the center piston 130 is inserted into the receptacle 122, as the first valve 231 is opened, the pressurizing area of the main piston 120 decreases.

The second valve 232 is disposed between an inner portion of the cylinder body 110 and the reservoir 210. When the main piston 120 moves in a backward direction, as the second valve 232 is opened, the brake oil may smoothly flow into the cylinder body 110.

The pedal simulator 260 is a member which provides a pedal feel to a driver of the vehicle and is connected to the reservoir 210 and the wheels FR, FL, RR, and RL. The pedal simulator 260 may include a brake pedal, a pressure sensor, and the like.

In the vehicle brake according to one embodiment of the present disclosure, as the main piston 120 moves in the forward direction, at least a part of the center piston 130 is inserted into the receptacle 122. The penetration hole 132 of which the size is smaller than the cross-sectional area of the receptacle 122 is formed in the center piston 130. In a state in which the center piston 130 is inserted into the receptacle 122, as the first valve 231 is opened and the main piston 120 moves in the forward direction, the pressurizing area of the main piston 120 decreases. Thus, braking efficiency of the vehicle during emergency braking may be enhanced, and a package size of a braking system may be reduced using the master cylinder 100 operating in a single-acting manner.

Figure 3:
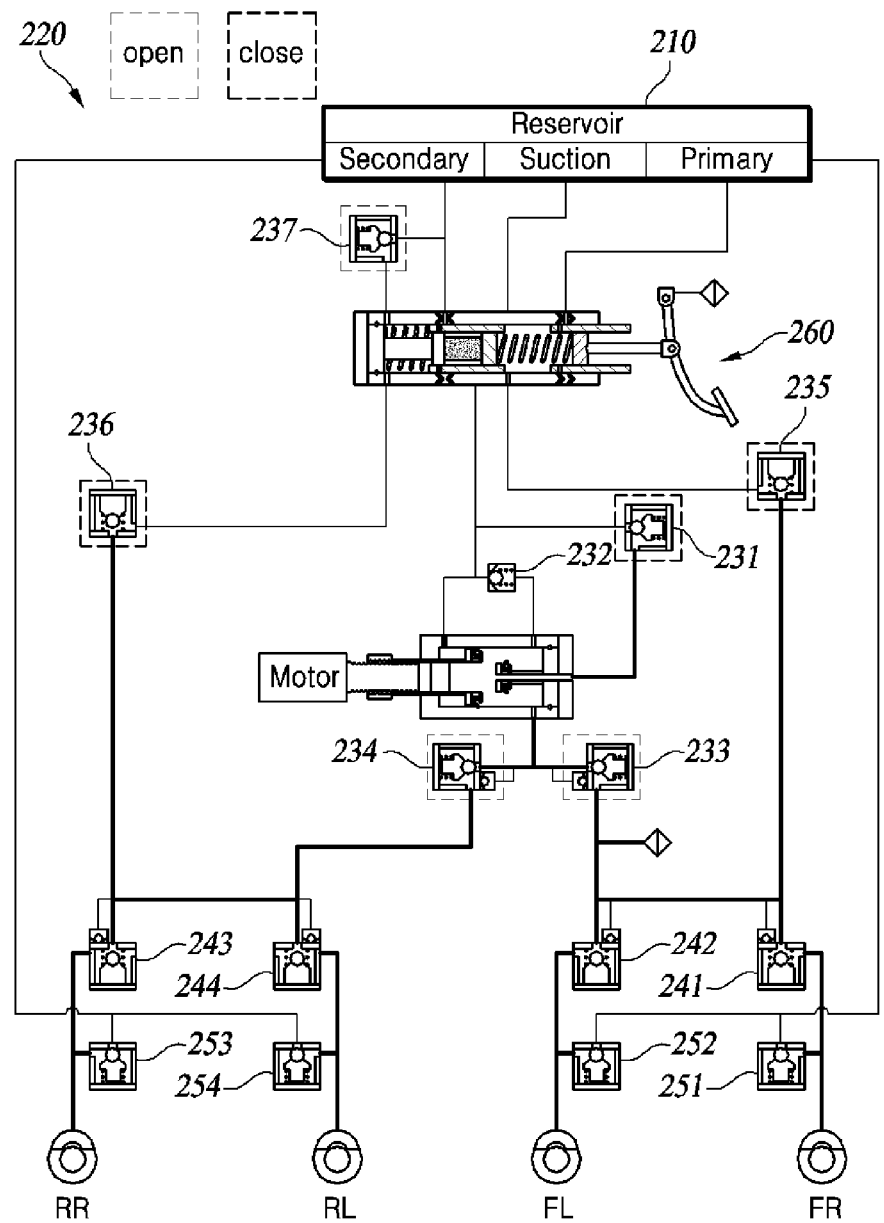
FIG. 3 is a view illustrating a working principle of a low pressure conventional brake system (CBS) of the vehicle brake according to one embodiment of the present disclosure.

FIG. 3 is a view illustrating a working principle of a low pressure conventional brake system (CBS) of the vehicle brake according to one embodiment of the present disclosure.

Figure 4:
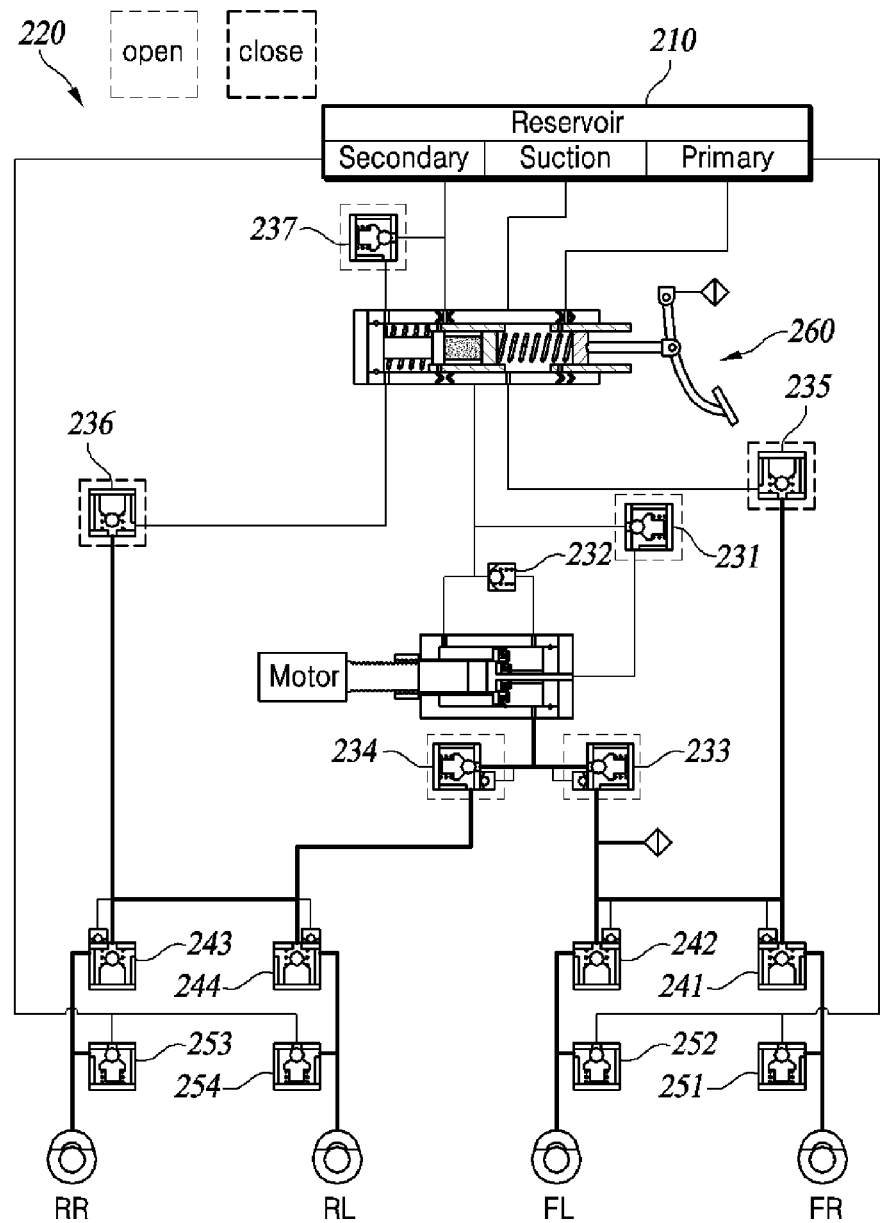
FIG. 4 is a view illustrating a working principle of a high pressure CBS of the vehicle brake according to one embodiment of the present disclosure.

FIG. 4 is a view illustrating a working principle of a high pressure CBS of the vehicle brake according to one embodiment of the present disclosure.

Referring to FIGS. 3 and 4, in a state in which the low pressure CBS operates, the control unit closes the first valve 231 and moves the main piston 120 in the forward direction in order to generate a hydraulic pressure required for braking the vehicle. As the main piston 120 moves in the forward direction, the hydraulic pressure is generated in the cylinder body 110. The hydraulic pressure generated in the cylinder body 110 is transferred to the wheels FR, FL, RR, and RL of the vehicle using the hydraulic circuit 220. The control unit determines the displacement of the main piston 120 using the position sensor. The vehicle brake according to one embodiment may be designed so that the desired pressure is generated in the hydraulic circuit 220 when the main piston 120 reaches one side end of the center piston 130. In this case, one side end of the center piston 130 is an end, which is inserted into the receptacle 122, of both ends of the center piston 130. The desired pressure is a hydraulic pressure which is required for braking the vehicle or which is a pressure set to perform an anti-lock brake system (ABS) function.

In a state in which the high pressure CBS operates, the control unit closes the first valve 231 and moves the main piston 120 in the forward direction. The control unit determines the displacement of the main piston 120 using the position sensor. When a pressure generated in the hydraulic circuit 220 is lower than the desired pressure even though the main piston 120 reaches one side end of the center piston 130, the control unit opens the first valve 231 and moves the main piston 120 in the forward direction again. As a pressurizing area of the main piston 120 decreases and the main piston 120 moves in the forward direction, a pressure higher than the desired pressure may be generated in the hydraulic circuit 220.

Figure 5:
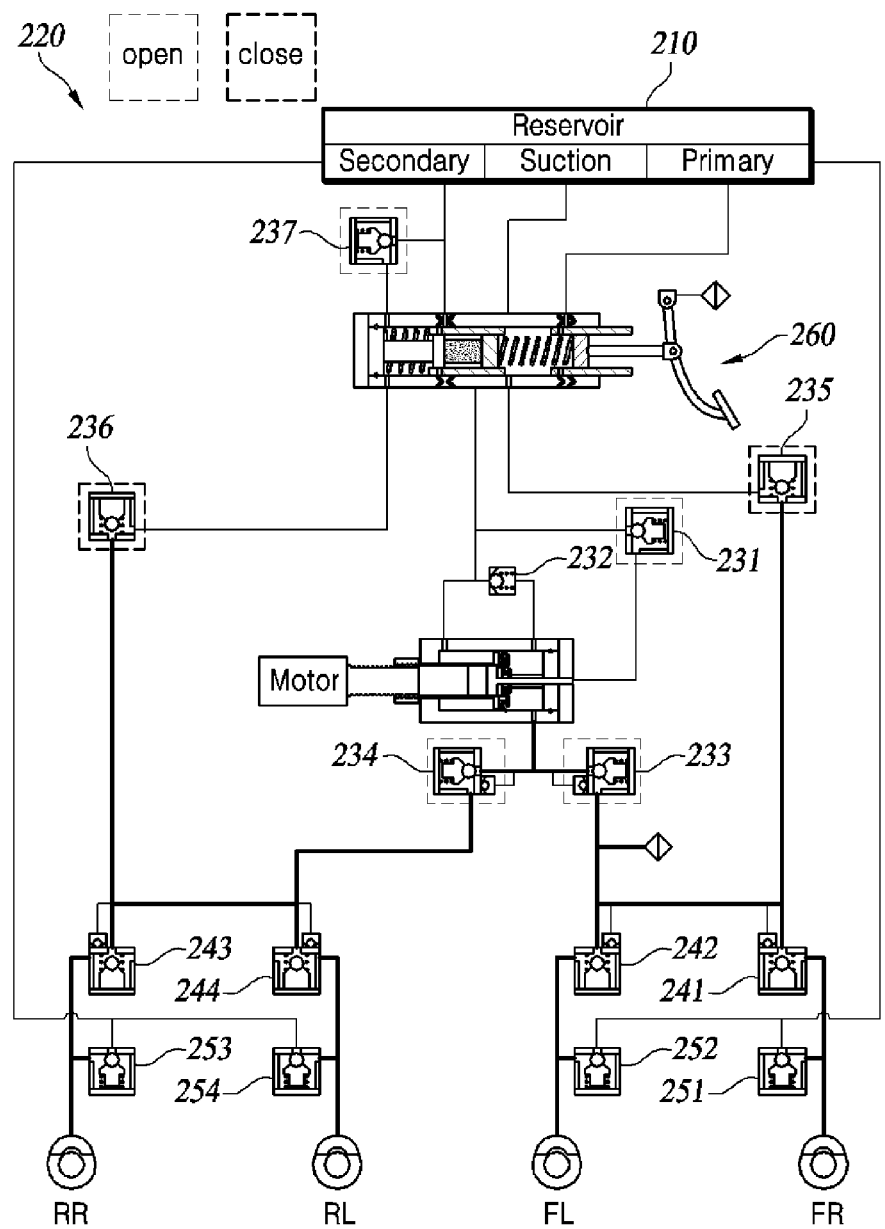
FIG. 5 is a view illustrating a working principle of an anti-lock brake system (ABS) of the vehicle brake according to one embodiment of the present disclosure.

FIG. 5 is a view illustrating a working principle of an ABS of the vehicle brake according to one embodiment of the present disclosure.

The working principle of the ABS of the vehicle brake according to one embodiment will be described with reference to FIG. 5.

When the ABS function of the vehicle is being performed, the control unit determines displacement of the main piston 120. When the main piston 120 moves by as much as a maximum displacement in the forward direction, the control unit controls hydraulic pressures generated at the wheels FR, FL, RR, and RL using inlet valves 241, 242, 243, and 244 and outlet valves 251, 252, 253, and 254. The control unit moves the main piston 120 in the backward direction so that the brake oil flows into the cylinder body 110. The control unit moves the main piston 120 in the forward direction again to generate a hydraulic pressure in the cylinder body 110.

When the ABS function is being performed, the control unit determines a state of a ground surface on which the vehicle is traveling. The control unit may determine the state of the ground surface using a pressure (hereinafter, "wheel control pressure") required for controlling the wheels FR, FL, RR, and RL. The control unit compares the wheel control pressure and a preset pressure. When the wheel control pressure is lower than the preset pressure, the control unit determines that the ground surface is in a low friction state. When the control unit determines that the ground surface is in the low friction state, the control unit controls the main piston 120 to move in the backward direction by as much as the maximum displacement and to move in the forward direction again. When the wheel control pressure is higher than the preset pressure, the control unit determines that the ground surface is in a high friction state. When the control unit determines that the ground surface is in the high friction state, the control unit moves the main piston 120 in the backward direction to one side end of the center piston 130 and moves the main piston 120 in the forward direction again.

Figure 6:
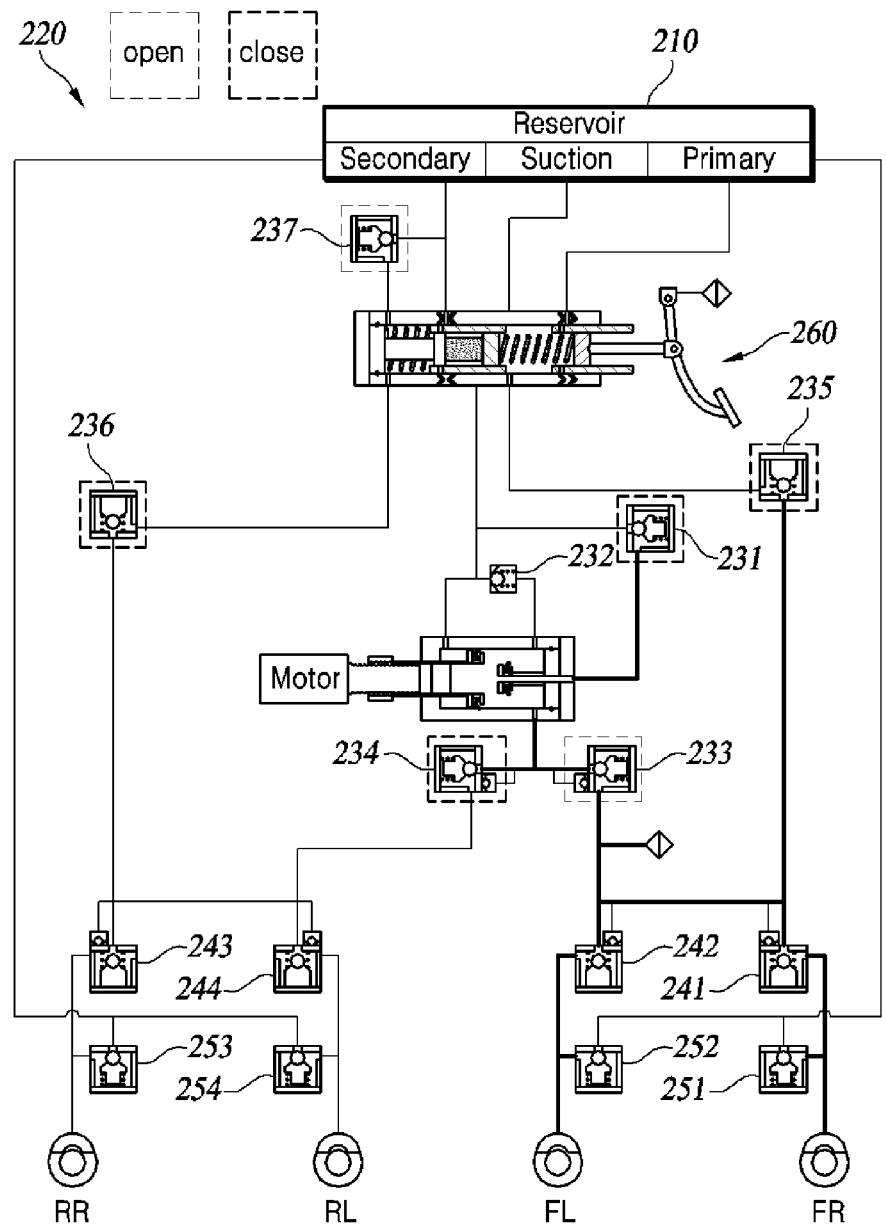
FIG. 6 is a view illustrating a working principle when a hydraulic circuit of the vehicle brake according to one embodiment of the present disclosure is leaking.

FIG. 6 is a view illustrating a working principle when the hydraulic circuit of the vehicle brake according to one embodiment of the present disclosure is leaking.

Referring to FIG. 6, when the control unit determines that a brake oil of the hydraulic circuit 220 of a side of the rear wheel leaks, the control unit opens a front wheel valve 233 and closes a rear wheel valve 234. The control unit moves the main piston 120 in the forward direction to supply a hydraulic pressure to the front wheels FR and FL so as to brake the vehicle.

Figure 7:
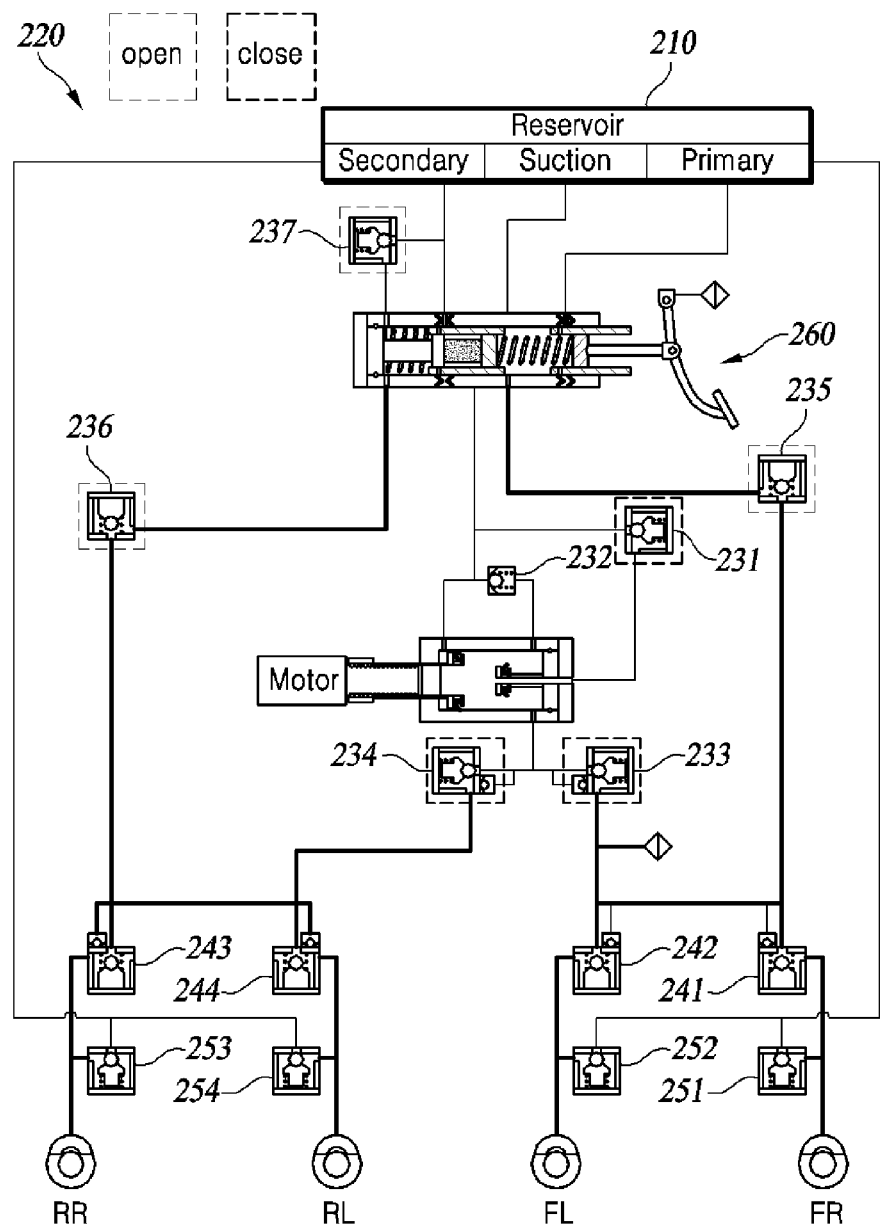
FIG. 7 is a view illustrating a working principle when backup braking is performed by the vehicle brake according to one embodiment of the present disclosure.

FIG. 7 is a view illustrating a working principle when backup braking is performed by the vehicle brake according to one embodiment of the present disclosure.

Referring to FIG. 7, when backup braking of the vehicle is performed, the control unit closes the first valve 231, the front wheel valve 233, and the rear wheel valve 234 and closes a front wheel backup valve 235 and a rear wheel backup valve 236. The control unit transfers a hydraulic pressure generated by the pedal simulator 260 to the wheels FR, FL, RR, and RL to brake the vehicle.

Figure 8:
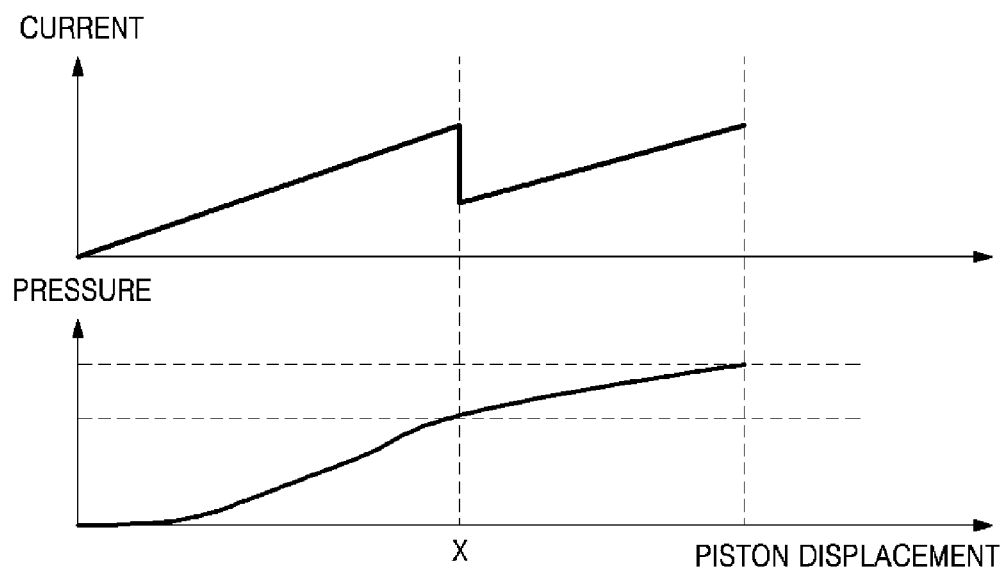
FIG. 8 is a graph showing a relationship between displacement of a main piston of the vehicle brake according to one embodiment of the present disclosure and a current applied to a motor.

FIG. 8 is a graph showing a relationship between the displacement of the main piston of the vehicle brake according to one embodiment of the present disclosure and a current applied to the motor.

Referring to FIG. 8, as the main piston 120 moves in the forward direction, a current applied to the motor 140 and a pressure generated in the cylinder body 110 increase. When the main piston 120 reaches one side end of the center piston 130 (piston displacement=x), as the first valve 231 is opened, the pressurizing area of the main piston 120 decreases. As the pressurizing area of the main piston 120 decreases, a force required for generating a pressure having the same magnitude decreases, and thus a current applied to the motor 140 decreases. As the main piston 120 moves in the forward direction again, the current applied to the motor 140 and the pressure generated in the cylinder body 110 increase. Thus, the vehicle brake according to one embodiment of the present disclosure has an effect of generating a high pressure using a low current.

Figure 9:
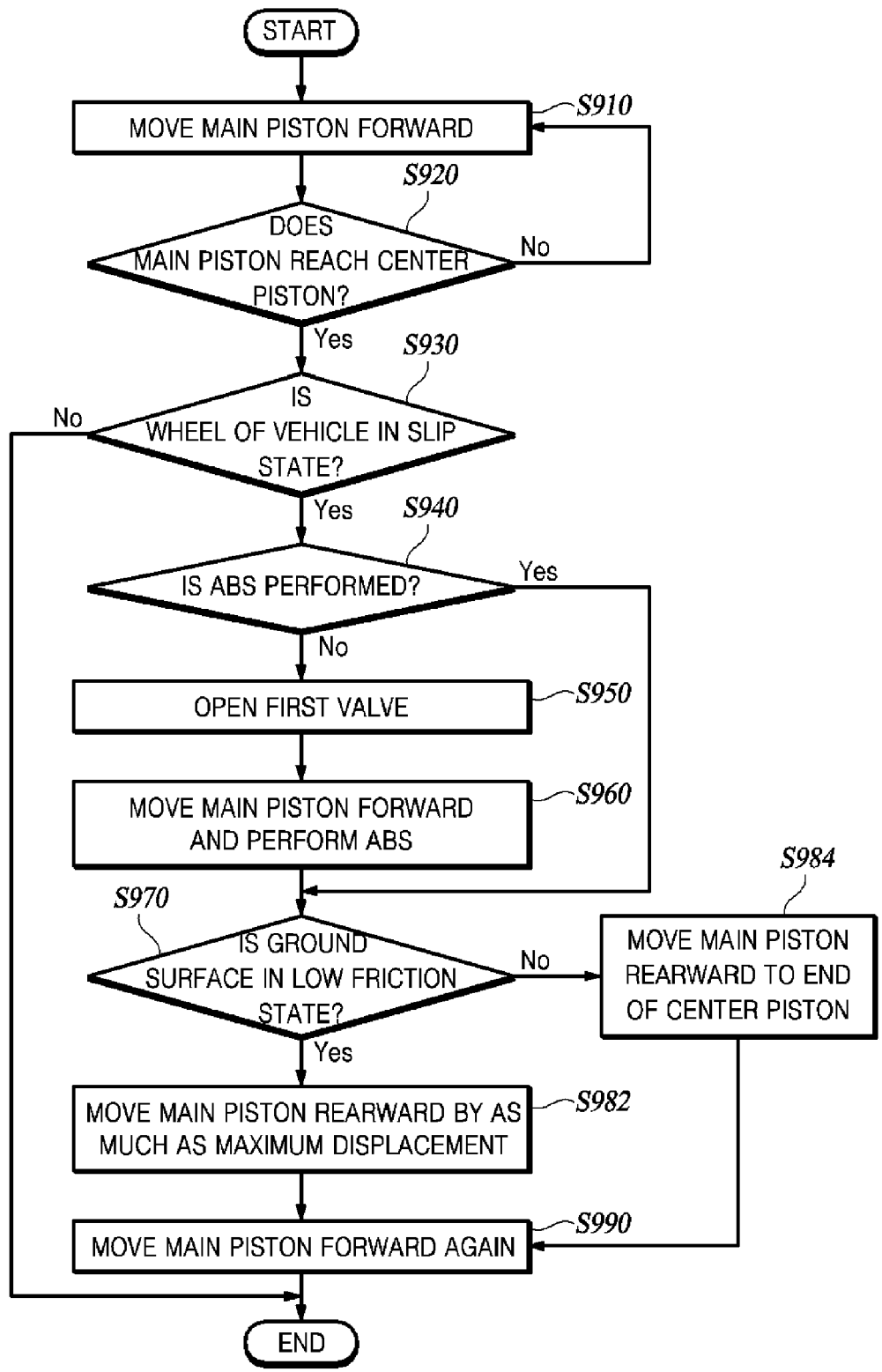
FIG. 9 is a flowchart illustrating a method of controlling the vehicle brake according to one embodiment of the present disclosure.

FIG. 9 is a flowchart illustrating a method of controlling the vehicle brake according to one embodiment of the present disclosure.

The control unit moves the main piston in the forward direction to generate a hydraulic pressure required for braking the vehicle (S910).

The control unit determines whether the main piston reaches one side end of the center piston (S920). The control unit determines displacement of the main piston 120 using the position sensor installed in the motor 140. Whether the main piston 120 reaches one side end of the center piston 130 may be determined on the basis of the displacement of the main piston 120.

When the control unit determines that the main piston reaches one side end of the center piston, the control unit determines whether the wheel of the vehicle is in a slip state (S930). The control unit may determine whether the wheels FR, FL, RR, and RL are in the slip state on the basis of whether the wheels FR, FL, RR, and RL of the vehicle rotate and whether the vehicle travels.

When the control unit determines that the wheel of the vehicle is in the slip state, the control unit determines whether the ABS function of the vehicle is performed (S940). The control unit may determine whether the ABS function is performed by comparing a pressure generated in the hydraulic circuit 220 and a pressure set to perform the ABS function.

When the control unit determines that the ABS function of the vehicle is not being performed, the control unit opens the first valve (S950). As the first valve 231 is opened, a pressurizing area of the main piston 120 decreases.

The control unit moves the main piston in the forward direction to perform the ABS function (S960). In a state in which the first valve 231 is opened, as the main piston 120 moves in the forward direction, a pressure, which is higher than the pressure set to perform the ABS function, is generated in the hydraulic circuit 220, and the ABS function of the vehicle is performed.

When the control unit determines that the ABS function of the vehicle is performed, the control unit determine a state of a ground surface on which the vehicle travels (S970). The control unit may determine the state of the ground surface using a wheel control pressure. The control unit compares the wheel control pressure and the preset pressure. The control unit determines that the ground surface is in a low friction state when the wheel control pressure is lower than the preset pressure and determines that the ground surface is in a high friction state when the wheel control pressure is higher than or equal to the preset pressure.

When the control unit determines that the ground surface is in the low friction state, the control unit moves the main piston in the backward direction by as much as a maximum displacement (S982). When the control unit determines the ground surface is in the low friction state, the control unit moves the main piston 120 in the backward direction by as much as the maximum displacement in order to transfer a higher hydraulic pressure to the wheel.

When the control unit determines that the ground surface is in the high friction state, the control unit moves the main piston to one side end of the center piston (S984). When the ground surface is in the high friction state, the control unit moves the main piston 120 in the backward direction to one side end of the center piston 130 in order to rapidly transfer the hydraulic pressure to the wheel.

The control unit moves the main piston in the forward direction again (S990). When the ABS function is performed, the control unit moves the main piston 120 in the forward direction in order to continuously supply the hydraulic pressure to the wheel of the vehicle.

According to one embodiment, since the vehicle brake uses a single-acting master cylinder including a piston of which a pressurizing area is changed, there is an effect of enhancing braking efficiency during emergency braking.

According to one embodiment, since the vehicle brake uses the single-acting master cylinder including the piston of which the pressurizing area is changed, there is an effect of reducing a package size of a braking system.

In the flowchart of the preset disclosure, the operations are sequentially performed but are only an example for describing the technical spirit of one embodiment of the present disclosure. In other words, since the present disclosure may be variously changed, modified, and applied by those skilled in the art including one embodiment of the present disclosure by changing the operations described in the flowchart and performing the changed operations without departing from the essential features of the embodiment of the present disclosure or performing one or more of the operations in parallel, the flowchart is not limited to a chronological order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:
1. A vehicle brake comprising:
   a reservoir configured to store a fluid;
   a hydraulic circuit configured to transfer a hydraulic pressure to a wheel of a vehicle;
   a plurality of valves configured to regulate a flow of the fluid in the hydraulic circuit; and
   a master cylinder including:
      a cylinder body;
      a main piston configured to move in a forward or backward direction and including a first end portion movable within the cylinder body when the main piston moves in the forward or backward direction; and
      a center piston disposed within the cylinder body and having a penetration hole,
      wherein the master cylinder has a receptacle located at the first end portion of the main piston and including an opening facing the center piston and a recessed space adjoining the opening,
      wherein the penetration hole is of a size smaller than a cross-sectional area of the receptacle, and
      wherein the master cylinder is configured such that (1) the center piston is completely ejected from the recessed space of the receptacle of the main piston via the opening when the main piston moves in the backward direction, and (2) the center piston is at least partially inserted into the receptacle via the opening when the main piston moves in the forward direction.

2. The vehicle brake of claim 1, wherein the master cylinder further includes:
a motor coupled to a second end portion of the main piston and configured to generate a driving force;
a screw connected to the motor and configured to rotate when driven by the driving force; and
a nut connected to the screw and configured to move in a longitudinal direction of the screw when the screw rotates,
wherein the main piston is configured to move when the nut moves.

3. The vehicle brake of claim 2, wherein the master cylinder further includes a position sensor coupled to the motor.

4. The vehicle brake of claim 1, wherein the reservoir is connected to an inner portion of the cylinder body and the penetration hole.

5. The vehicle brake of claim 4, wherein the plurality of valves includes a valve positioned between the penetration hole and the reservoir.

6. The vehicle brake of claim 4, wherein the plurality of valves includes a valve positioned between the inner portion of the cylinder body and the reservoir.

7. The vehicle brake of claim 1, further comprising a pedal simulator configured to provide a pedal feel to a driver of the vehicle.

8. The vehicle brake of claim 1, wherein the master cylinder is configured to operate in a single-acting manner.

9. The vehicle brake of claim 1, wherein:
the master cylinder further includes a plurality of sealing members positioned between an inner surface of the cylinder body and an outer surface of the main piston and positioned on an outer surface of the center piston; and
the plurality of sealing members is configured to transfer the fluid unidirectionally.

10. A method of controlling a vehicle brake including (a) a main piston having a side at which a receptacle is positioned and (b) a center piston having a penetration hole of a size smaller than a cross-sectional area of the receptacle, the method comprising:
moving the main piston in a forward direction;
determining whether the main piston has reached the center piston;
determining whether a wheel of a vehicle is in a slip state;
in response to determining that the wheel of the vehicle is in the slip state, determining whether an anti-lock brake system (ABS) function is being performed; and
in response to determining that the ABS function is not being performed, performing:
opening a first valve positioned between the penetration hole and a reservoir; and
moving the main piston in the forward direction again.

11. The method of claim 10, further comprising:
in response to determining that the ABS function is being performed, determining a state of a ground surface on which the vehicle travels;
in response to determining that the ground surface is in a low friction state, moving the main piston in a backward direction for a maximum displacement;
in response to determining that the ground surface is in a high friction state, moving the main piston in the backward direction to the center piston; and
moving the main piston in the forward direction again.

* * * * *